United States Patent [19]

Helmbrecht et al.

[11] Patent Number: 5,685,274
[45] Date of Patent: Nov. 11, 1997

[54] FUEL-INJECTION PUMP

[75] Inventors: Peter Helmbrecht, Esslingen; Wolfgang Fehlmann, Stuttgart; Gerold Schultheiss, Pforzheim; Dieter Junger, Stuttgart; Bodo Kebrich, Merzweiler, all of Germany; J. Paul Morel-Fourrier, Valencin, France

[73] Assignee: Robert Bosch GmbH, Stuttgart, Germany

[21] Appl. No.: 464,897

[22] PCT Filed: Nov. 24, 1994

[86] PCT No.: PCT/DE94/01390

§ 371 Date: Jun. 29, 1995

§ 102(e) Date: Jun. 29, 1995

[87] PCT Pub. No.: WO95/15434

PCT Pub. Date: Jun. 8, 1995

[30] Foreign Application Priority Data

Dec. 4, 1993 [DE] Germany ............ 43 41 424.9

[51] Int. Cl.$^6$ ..................................... F02M 41/00
[52] U.S. Cl. ............................. 123/450; 123/495
[58] Field of Search ......................... 123/495, 450; 417/462

[56] References Cited

U.S. PATENT DOCUMENTS

| | | | |
|---|---|---|---|
| 4,167,926 | 9/1979 | Leblanc | 123/495 |
| 4,362,141 | 12/1982 | Mowbray | 123/450 |
| 4,462,370 | 7/1984 | Jarrett | 123/450 |
| 4,709,673 | 12/1987 | Babitzka | 123/450 |
| 5,138,997 | 8/1992 | Fehlmann | 123/495 |
| 5,462,029 | 10/1995 | Nicol | 123/450 |
| 5,546,906 | 8/1996 | Cooke | 123/450 |

FOREIGN PATENT DOCUMENTS

| | | | |
|---|---|---|---|
| 1080880 | 12/1954 | France | 123/450 |
| 167747 | 10/1956 | Germany | 123/450 |
| 1108512 | 7/1961 | Germany | 123/450 |
| 2080572 | 2/1982 | United Kingdom | 123/450 |

*Primary Examiner*—Carl S. Miller
*Attorney, Agent, or Firm*—Edwin E. Greigg; Ronald E. Greigg

[57] ABSTRACT

A fuel-injection pump of the distributor type has a distributor shaft which is coupled fixedly in terms of rotation to a drive shaft and which, during rotation, successively supplies an injection nozzle with fuel from a pump working space. Seated displaceably in each case in one of a plurality of radial bores in the distributor shaft are pump pistons which, on the one hand, limit the pump working space and, on the other hand, bear non-positively on a coaxial cam ring via rollers held in roller shoes. For a construction of the injection pump which is advantageous in manufacturing terms, the drive shaft engages over the distributor shaft by means of a cup-like coupling head, and a number corresponding to the number of radial bores, of axial slots for the displaceable reception of the roller shoes are made in the cup wall. The coupling takes place via a coupling disk which is seated positively in the axial slots by means of radially projecting coupling webs and which positively receives in a recess an end projection on the distributor shaft.

18 Claims, 5 Drawing Sheets

FUEL-INJECTION PUMP

STATE OF THE ART

The invention is directed to a fuel-injection pump as set forth hereinafter.

In a known fuel-injection pump of this so-called distributor type with radial pistons (EP 0,244,340 B1 or EP 0,303,237 A2), the distributor shaft carries, in the region of the radial bores receiving the pump pistons, a shaft portion of substantially larger diameter, in which radial indentations are made in line with the radial bores receiving the radial pistons, in which indentations the roller shoes together with the rollers or cylinders rotatably held therein are inserted displaceably. The coupling of the distributor shaft and drive shaft takes place via pairs of claws which project on the end faces of the distributor shaft and drive shaft and which engage without play in one another.

This constructive design necessitates a high manufacturing outlay for producing the distributor shaft and the cam mechanism, thus resulting in high manufacturing costs.

ADVANTAGES OF THE INVENTION

An advantage of the fuel-injection pump is that, by shifting the roller shoes together with the rollers into the drive shaft rotating synchronously with the distributor shaft, the distributor shaft can be produced substantially more simply as a lathe-turned part, and that, by inserting the roller shoes together with the rollers into simple axial slots in the hollow-cylindrical drive-shaft coupling head engaging over the distributor shaft on its end face, the drive shaft too can be manufactured cost-effectively; for in contrast to recesses or indentations to be countersunk radially in solid bodies of revolution, axial passage slots can be produced in hollow-cylindrical bodies of revolution very much more simply and cost-effectively in manufacturing terms.

Advantageous developments and improvements of the fuel-injection pump specified in herein are possible as a result of the measures listed hereinafter.

In a preferred embodiment of the invention, the rotationally fixed coupling between the drive shaft and distributor shaft is brought about by a coupling disk which is seated in the axial slots in the coupling head by means of coupling webs projecting radially on the disk circumference and preferably in one piece with said disk and which positively receives in a central recess a projection on the end face of the distributor shaft.

For a positive connection between the radial coupling webs of the coupling disk and the axial slots in the coupling head on the one hand, and between the central recess of the coupling disk and a projection on the distributor shaft, on the other hand, is such that there is a cardanic connection between the drive shaft and distributor shaft, with the result that tolerance-related offsets between the drive shaft and distributor shaft are compensated without difficulty.

If there are altogether four axial slots in the coupling head, which are in each case arranged offset at 90° to one another, and, correspondingly, four radial coupling webs on the coupling disk which are arranged offset at 90° to one another, such a cardanic articulation of the distributor shaft on the drive shaft is achieved, according to an expedient embodiment of the invention, in that two coupling webs arranged diametrically to one another are seated in the associated axial slots without play in the circumferential direction and the recess in the coupling disk has two flanks which extend parallel and at right angles to the coupling webs seated without play in the axial slots and against which the projection on the distributor shaft bears without play by means of parallel spigot surfaces facing away from one another.

According to a further embodiment of the invention, the two remaining coupling webs of the coupling disk which are located diametrically opposite one another are seated with play in the circumferential direction in the associated axial slots in the coupling head. The circumferential play is appropriately adapted to tolerances (center offset) occurring.

According to an advantageous embodiment of the invention, the coupling disk rests on the slot bottom of the axial slots and forms an axial limiting wall for the roller shoes. As a result, the slot bottom does not have to be particularly plane for the roller shoes to bear on it, so that the most cost-effective production process can be employed for producing the axial slots. For example, these can be cut in by means of a rotating parting or grinding wheel into the cylindrical wall of the coupling head from its free end face, the grinding wheel being advanced increasingly axially from the free end of the coupling head. The axial slots can each be cut in individually. However, if there is an even number of axial slots in the coupling head, two diametrically opposite axial slots can also in each case be cut in simultaneously in a single operation.

According to an expedient embodiment of the invention, the coupling disk performs the function of limiting the torque in relation to the distributor shaft. It forms a predetermined breaking point in the event of a seizure of the distributor shaft, for which purpose the coupling disk, by a choice of material or shaping, is designed in such a way that the radially projecting coupling webs break off when the permitted torque maximum is exceeded.

According to a preferred embodiment of the invention, the mounting of the drive shaft in the pump casing is effected by a plain bearing bush near the exit of the drive shaft from the pump casing and by a ball bearing between the coupling head and pump casing which is supported both radially and axially on the coupling head. This ensures an accurate shaft mounting in the axial and radial direction, this being of the greatest importance, particularly in conjunction with a sensor for recording the rotary-angle position of the drive shaft, for avoiding the influences of errors in the sensor output signal. The large bearing spacing between the two bearings means that only low bearing forces are generated in each bearing, with the result that the lifetime of the bearings is increased. The provision of the axial bearing does not necessitate an increased axial overall length, since the bearing outer ring is arranged in such a way that it covers the assembly clearance, necessary for the driving pin on the cam ring, inside the pump casing.

In a preferred embodiment of the invention, the coupling head has an axial portion of reduced diameter on its free end face. There bears on the annular shoulder, which forms at the transition to the end portion of reduced diameter, a thrust washer slipped onto the end portion. The inner ring of the ball bearing is supported radially on the end portion of smaller diameter of the coupling head and axially on the thrust washer and is retained in the axial direction by a retaining ring. As a result of this constructive measure, the pressed-on inner ring of the ball bearing stiffens the free ends of the claw-like wall segments of the coupling head which remain between the axial slots. The deformation of said wall segments in the radial direction, caused by the transmission of the drive torque to the roller shoes, is thereby substantially limited. The result of this is lower wear in the cam mechanism on account of smaller inclinations of the roller shoes and an improvement in the injection-pressure trend on account of lower elasticity.

DRAWING

The invention is explained in more detail in the following description by means of an exemplary embodiment illustrated in the drawing. In this:

FIG. 1 shows a longitudinal section through a fuel-injection pump of the distributor type with radial pistons for an internal-combustion engine, FIG. 2 shows a section through the coupling head and cam ring along the line II—II in FIG. 1, FIG. 3 shows a section along the line III—III in FIG. 1, FIG. 4 shows a side view of a drive shaft of the fuel-injection pump in FIG. 1, FIG. 5 shows a top view of a thrust washer seated on the coupling head of the drive shaft in FIG. 4, FIG. 6 shows a top view of a coupling disk seated in the coupling head of the drive shaft in FIG. 4, FIG. 7 shows a cross section through the coupling head of the drive shaft in FIG. 4, with a coupling disk seated in it, according to a further exemplary embodiment, FIGS. 8 and 9 each show diagrammatically a longitudinal section through the coupling head of the drive shaft in FIG. 4 to illustrate the production of the axial slots.

DESCRIPTION OF THE EXEMPLARY EMBODIMENT

Figure 1:
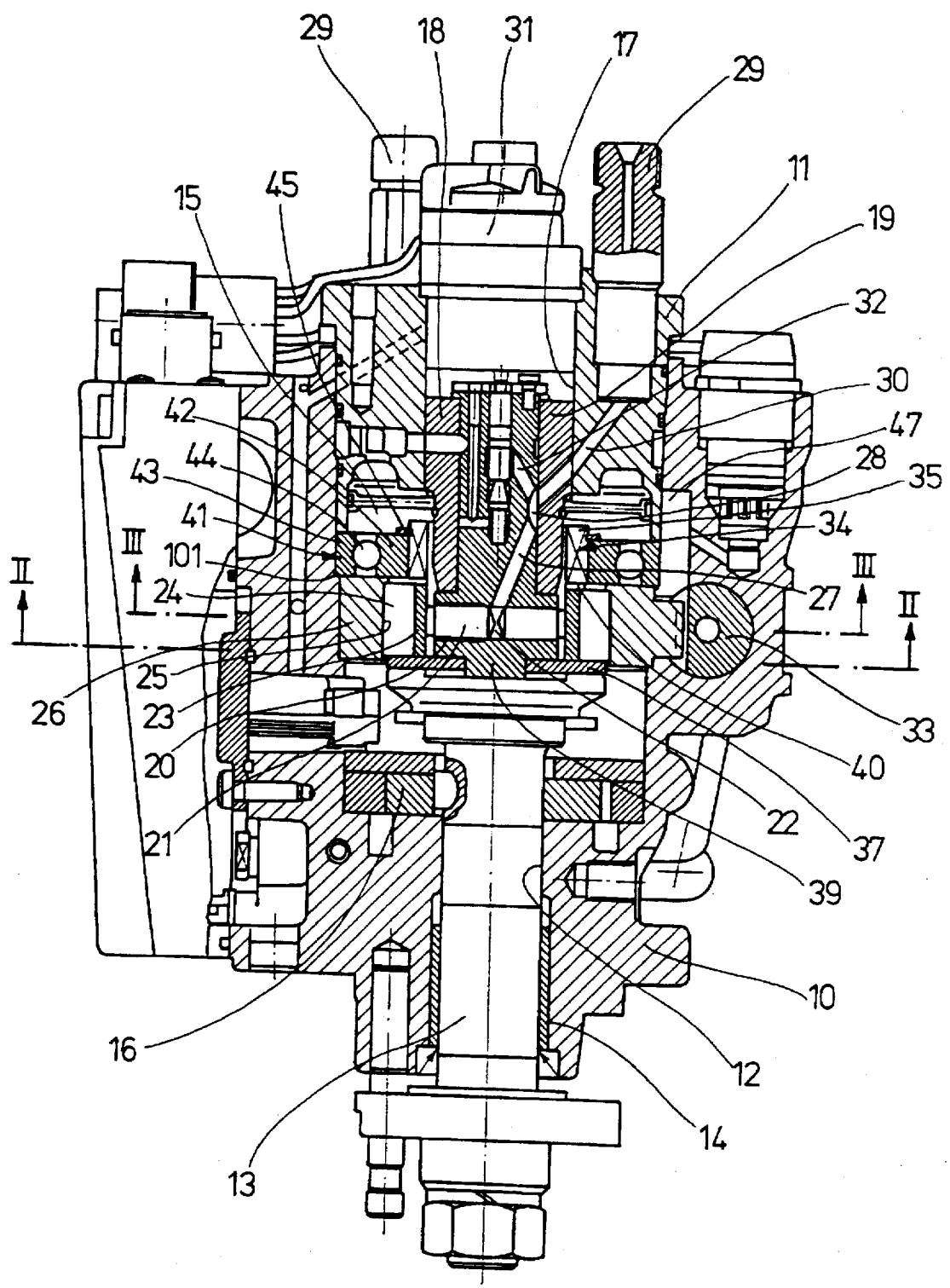
Figure 3:
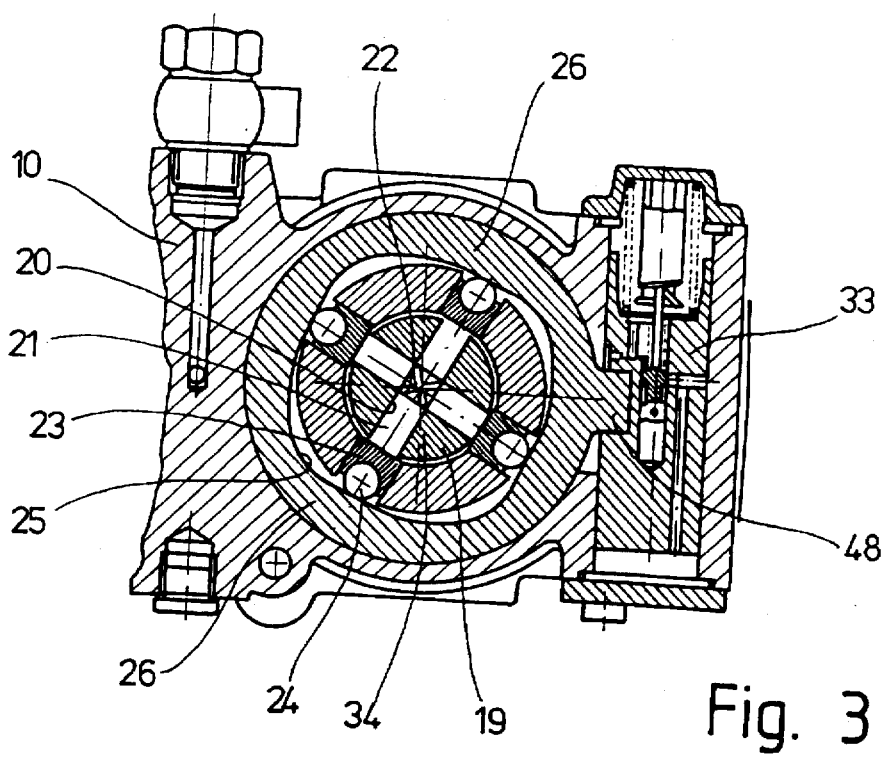

The fuel-injection pump of the distributor type, shown in longitudinal section in FIG. 1, serves for supplying a plurality of, here four injection nozzles 29 of a diesel engine with fuel of predetermined metering which is under injection pressure. The fuel-injection pump has a pump casing 10, into which a distributor body 11 is inserted from one end face and a central bore 12 is made from the other end face, in which central bore 12 a drive shaft 13 is held rotatably by means of a plain bearing bush 14 inserted into the bore 12. The distributor body 11 limits, inside the pump casing 10, a pump inner space 15 filled with fuel which is maintained under feed pressure by a feed pump 16 seated fixedly in terms of rotation on the drive shaft 13. Made in the distributor body 11 coaxially relative to the drive shaft 13 is a further bore 17, into which a guide bush 18 rotatably receiving the distributor shaft 19 is inserted. The distributor shaft 19 is coupled fixedly in terms of rotation to the drive shaft 13, as is explained in more detail below. The distributor shaft 19 carries four radial bores 20 which are offset at identical circumferential angles to one another and in each of which a radial piston 21 is guided axially displaceably (FIGS. 1 and 3). The four radial pistons 21 limit with one end face a central pump working space 22 and with their other end face bear, in each case via a roller shoe 23 and a roller 24 rotatably held therein, on a cam track 25 which is formed on the inner face of a cam ring 26 coaxially surrounding the drive shaft 13 and distributor shaft 19. The pump working space 22 is connected via a distributor bore 27 to a distributor groove 28 which, during the rotation of the distributor shaft 19, successively connects the pump working space 22 to an injection bore 30 leading to one of the injection nozzles 29. The injection operation is terminated by opening a solenoid valve 31 which connects a relief bore 32 leading to the distributor groove 28 and located in the distributor shaft 19 to the pump inner space 15. The injection pressure is generated by means of the lifting movement of the radial pistons 21 which is imparted to these, during the rotation of the distributor shaft 19, by the cam track 25 on the cam ring 26, the radial pistons 21 bearing non-positively via the roller shoes 23 and rollers 24 on this cam track 25 by means of the pressure in the pump working space 22. To set the start of injection, the cam ring 26 can be rotated in a known way in the circumferential direction within limits by an injection timer 33, the adjustment taking place in dependence on the fuel-feed pressure prevailing in the pump inner space 15.

Figure 4:
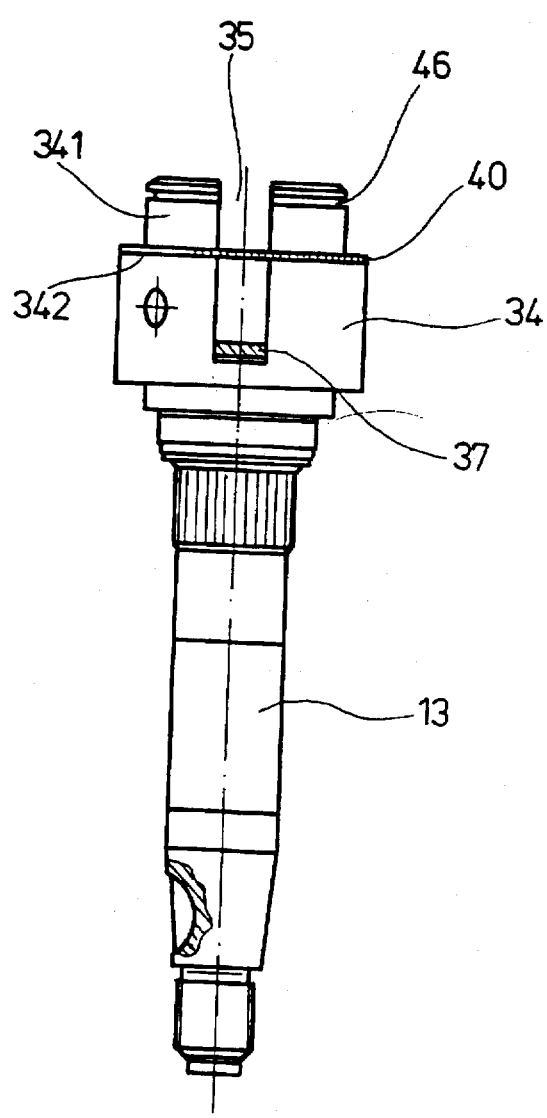
Figure 8:
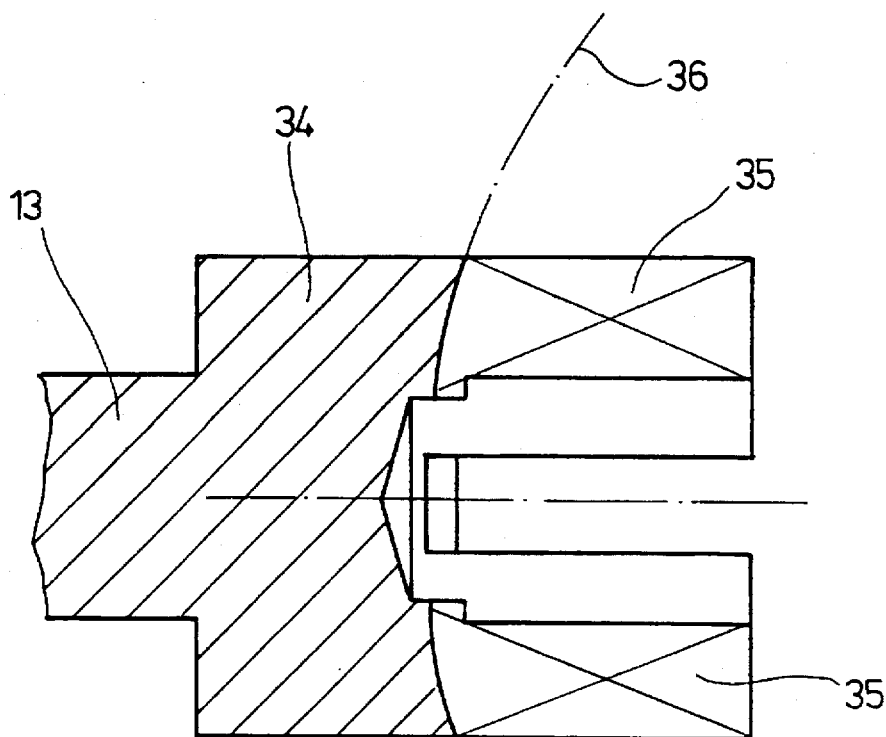

For coupling the drive shaft 13 and distributor shaft 19, a stub-like coupling head 34 engaging over the distributor shaft 19 in a cup-like manner is formed at the end of the drive shaft 13 facing the distributor shaft 19 (FIGS. 1 and 4). Four axial slots 35 (see also FIG. 2) are made in the hollow-cylindrical wall of the coupling head 34 according to the number of radial bores 20 and radial pistons 21 and terminate freely on the free end face of the coupling head 34. The axial slots 35 are arranged offset at the same circumferential angles as the radial bores 20 to one another, that is to say here at 90°, and the assignment of the coupling head 34 and distributor shaft 19 is such that the radial bores 20 in the distributor shaft 19 are radially aligned with the axial slots 35 in the coupling head 34. As shown diagrammatically in FIG. 8, the axial slots 35 are made in a technically very simple way by a parting or grinding wheel which is applied to the free end face of the coupling head 34 and which is advanced increasingly axially. The wheel circumference of the grinding wheel is indicated at 36 in FIG. 8. Two operations are necessary in order to produce the altogether four axial slots 35 offset in each case at 90°, two diametrically opposite axial slots 35 being produced during each operation. The slot bottom of the axial slots 35 is in the form of an arc of a circle.

Figure 2:
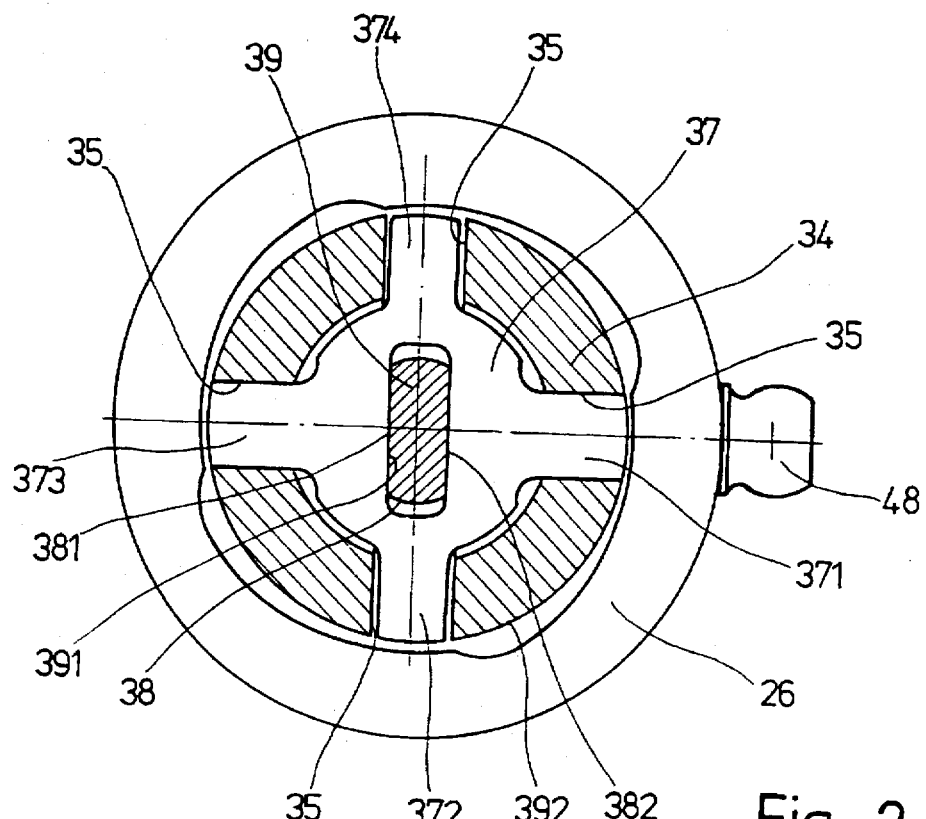

Seated on the bottom of the axial slots 35 is a coupling disk 37 (FIGS. 1, 2, 4 and 6) with four coupling webs 371–374 which project radially on the disk circumference and are in one piece with the coupling disk 37 and which are arranged offset at identical circumferential angles of 90° to one another. As becomes clear from FIG. 2, two diametral coupling webs 371 and 373 are seated without play in the circumferential direction in the associated axial slots 35, whilst the other two coupling webs 372 and 374 are provided with the play necessary for the tolerances occurring in the center offset between the drive shaft 13 and distributor shaft 19, the axial slots 35 having the same width, that is to say are made narrower than the coupling webs 371, 373. The coupling disk 37 carries centrally a central recess 38 which positively receives an end projection 39 which projects coaxially on the end face of the distributor shaft 19 (FIGS. 1 and 2). The recess 38 is dimensioned rectangularly, the two parallel longitudinal sides 381, 382 extending at right angles to those coupling webs 371, 373 which are seated without play in their associated axial slots 35. The end projection 39 of the distributor shaft 19 bears without play on these longitudinal sides 381, 382 by means of parallel projection surfaces 391, 392 pointing away from one another. This design of the coupling webs 371, 373 and of the recess 38 achieves a supporting articulation of the distributor shaft 19 on the drive shaft 13 which compensates a tolerance-related center offset of the drive shaft 13 and distributor shaft 19.

The coupling disk 37, in addition to the function of connecting the drive shaft 13 and distributor shaft 19 fixedly in terms of rotation, also has the function of torque limitation. For this purpose, the coupling disk 37 is designed in such a way that the radially projecting coupling webs 371–374 break off when the predetermined torque maximum is exceeded. A piston seizure in the distributor shaft 19 therefore leads to the breaking of the coupling disk 37 and consequently to the uncoupling of the drive shaft 13 and distributor shaft 19, so that further destruction in the fuel-injection pump is prevented.

Figure 5:
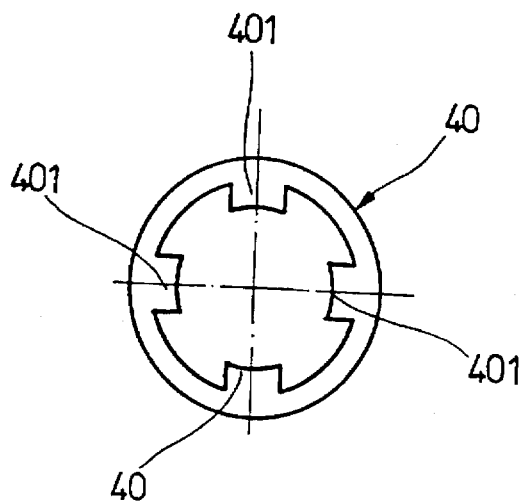
Figure 6:
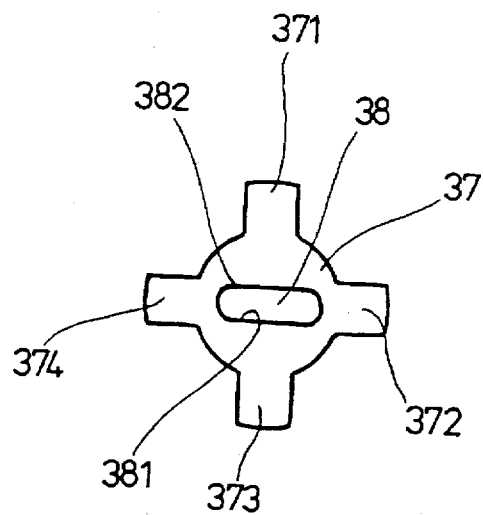

After the coupling disk 37 has been inserted into the coupling head 34, the roller shoes 23 together with rollers 24 rotatably mounted therein are inserted into the axial slots 35. The coupling webs 371 - 374 of the coupling disks 37 thus limit the guidance of the roller shoes 23 in the axial slots 35 in the axial direction. On the axially opposite side, the guidance of the roller shoes 23 is limited by a thrust washer 40 (FIGS. 1, 4 and 5) which is slipped onto the coupling head 34. The coupling head 34 has an axial portion 341 of reduced diameter on its free end face. Pushed onto this axial portion 341 is the thrust washer 40 which comes to bear on an annular shoulder 342 of the coupling head 34, said annular shoulder 342 forming at the transition to the axial portion 341 of reduced diameter, and which engages into the axial slots 35 by means of four tabs 401 offset at a circumferential angle of 90° to one another. The tabs 401 of the thrust washer 40 thus limit, together with the coupling webs 371–374 of the coupling disk 37, the axial movement of the roller shoes 23 in the guide slots of the roller shoes 23, said guide slots being formed by the axial slots 35.

For the improved mounting of the drive shaft 13 in the pump casing 10, by means of which mounting axial force components on the drive shaft 13 can also be absorbed, there is provided a ball bearing 41 with an inner bearing ring 42 and outer bearing ring 43 and with balls 44 rolling between them. The inner bearing ring 42 is pressed onto the axial portion 341 of reduced diameter radially against the thrust washer 40 and is retained by means of a retaining ring 45 which engages into an annular groove 46 in the axial portion 341. The outer bearing ring 43 of the ball bearing 41 is received with appropriate play in the pump casing 10 and is braced axially with the distributor body 11 against a casing shoulder 101. The outer bearing ring 43 covers, together with the distributor body 11, an axial assembly clearance 47 inside the pump casing 10. This assembly clearance 47 is necessary for assembling the one-part cam ring 26 which is coupled to the injection timer 33 by means of a radially projecting driving pin 48.

Figure 7:
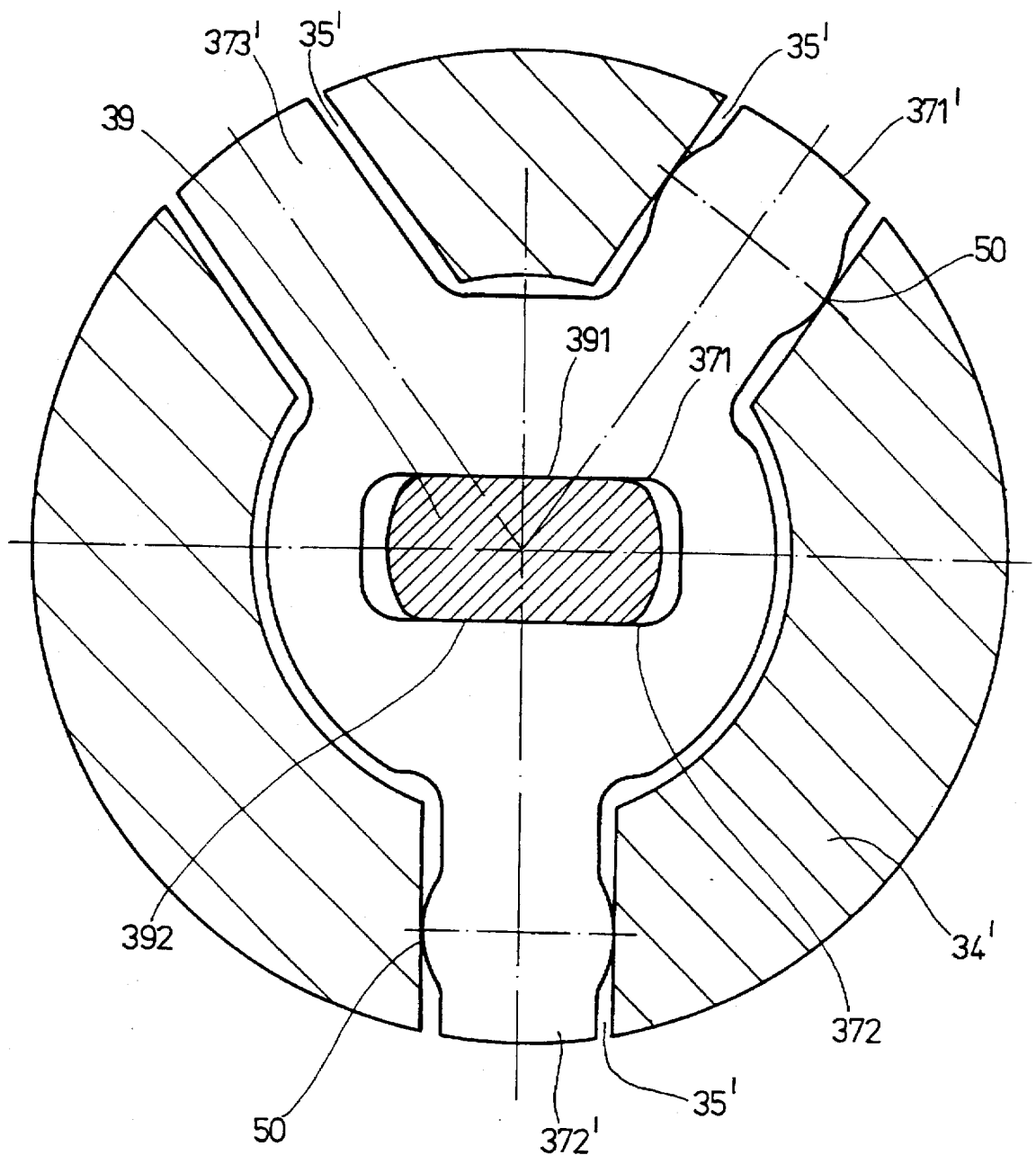
Figure 9:
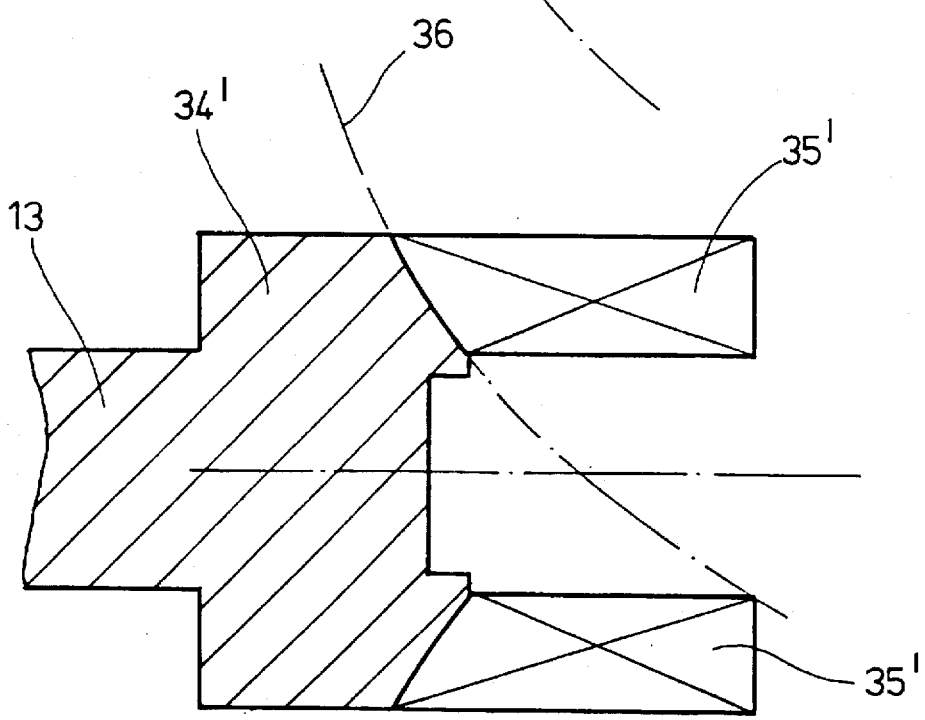

The design of the coupling head 34 on the drive shaft 13 for the coupling of the distributor shaft 19 is not restricted to the design of an even number of axial slots 35, four in the present example. Thus, if there is an odd number of radial bores 20 and of radial pistons 21 seated therein in the distributor shaft 19, an odd number of axial slots 35 in the coupling head 34' can also be provided, in which case, once again, each axial slot 35' receives displaceably in the radial direction the roller shoe 23 assigned to the radial piston 21 together with the roller 24 rotatably mounted therein. FIG. 7 shows a cross section through such a coupling head 34' having three axial slots 35', into which, once again, a coupling disk 37' projects by means of correspondingly three coupling webs 371', 372' and 373'. In accordance with the arrangement of the axial slot 35', the coupling web 372' is at a greater distance, measured as a circumferential angle, from the coupling web 371' and the coupling web 373' than the two coupling webs 371' and 373' are from one another. In contrast to the coupling web 373', the coupling webs 371' and 372' have a convex widening 50, by means of which they are seated in the associated axial slot 35' without play in the circumferential direction. In contrast, the coupling web 373' has play in the circumferential direction within the associated axial slot 35'. The recess 38, once again made rectangular, is oriented in such a way that its two longitudinal sides 381 and 382 extend at right angles to the middle coupling web 372' which is at the greatest distance from the other two coupling webs 371' and 373'. This constructive design for an odd number of axial slots 35' in the coupling head 34' likewise ensures an cardanic articulation of the distributor shaft 19 on the drive shaft 13. The production, simple in manufacturing terms, of the odd number of axial slots 35' in the hollow-cylindrical coupling head 34' is sketched in FIG. 9. Each axial slot 35' is cut individually into the hollow-cylindrical wall of the coupling head 34' by applying a parting or grinding wheel axially to the free end of the latter. The wheel circumference of the parting wheel is indicated by dot-and-dash lines in FIG. 9 and is designated by 36.

The foregoing relates to preferred exemplary embodiments of the invention, it being understood that other variants and embodiments thereof are possible within the spirit and scope of the invention, the latter being defined by the appended claims.

We claim:

1. A fuel injection pump of the distributor type for supplying a plurality of injection nozzles (29) of internal-combustion engines, which comprises, a rotating drive shaft (13) mounted in a pump casing (10), a distributor shaft (19) which is coupled fixedly in terms of rotation to the drive shaft (13) and which, during rotation, successively makes a connection between a pump working space (22) integrated in said pump and one of the injection nozzles (29), and with pump pistons (21) which are each seated axially displaceably in a radial bore (20) of the distributor shaft (19) and which by means of one end face, each pump piston limits the pump working space (22) and by means of another end face of each of said pump pistons, via rollers (24) held rotationally movably in roller shoes (23), bear non-positively on a cam track (25) of a cam ring (26) coaxialy relative to the distributor shaft (19) and fixed in the pump casing (10), wherein a stub-like coupling head (34) that engages the distributor shaft (19) in a cup like manner is formed at one end of the drive shaft (13) facing the distributor shaft (19), the rotationally fixed coupling between the drive shaft (13) and distributor shaft (19) takes place by means of a coupling disk (37; 37') which is seated in axial slots (35; 35') in the coupling head (34; 34') by means of radial coupling webs (371–374; 371'–373) that project radially on the disk circumference in one piece with the coupling disk (37; 37') and which positively receives a projection end (39) on an end face of the distributor shaft (19) in a control recess (38), a positive connection between the radial coupling webs (371–374; 371'–373') of the coupling disk (37; 37') and the axial slots (35' 35') in the coupling head (34' 34'), on the one hand, and between the central recess (38) in the coupling disk (37; 37') and the end projection (39) of the distributor shaft (19), on the other hand, is such that there is a supporting articulation of the drive shaft (11) and distributor shaft (19), the coupling disk (37) has at least two radial coupling webs (371, 372, 373, 374; 371' 372' 373') offset from one another, of which two radial coupling webs form an angle greater than 90° with one another and rest without play in the axial slots (35); the recess (38) in the coupling disk (37) has two parallel sides extending at right angles to at least one of the coupling webs that rest without play in the axial slots (35), on which the sides of the face-end projection (39) of the distributor shaft (19) rests with projection faces parallel to one another, the length of said projection faces is greater than the face end projections located perpendicular to said projection faces, said latter faces are spaced apart from corresponding boundaries of the recess (38), and the coupling lands that are not guided with play engage the axial slots with lateral play, and wherein the two remaining coupling webs (372, 374) of the coupling disk (37) which are located diametrically opposite one another are seated with play in the circumferential direction in the associated axial slots (35) in the coupling head (34).

2. A fuel injection pump of the distributor type for supplying a plurality of injection nozzles (29) of internal-combustion engines, which comprises, a rotating drive shaft (13) mounted in a bearing bush (14) supported in a central bore (12) in a pump casing (10) near an exit of said drive shaft (13) from said pump housing, said drive shaft (13) is affected by a ball bearing (41) between a coupling head (34) and the pump casing (10) with said ball bearing supported radially and axially on the coupling head (34), a distributor shaft (19) is coupled fixedly in terms of rotation to the drive shaft (13) and which, during rotation, successively makes a connection between a pump working space (22) integrated in said pump and one of the injection nozzles (29), and with pump pistons (21) which are each seated axially displaceably in a radial bore (20) of the distributor shaft (19) and which by means of one end face, each pump piston limits the pump working space (22) and by means of another end face of each of said pump pistons, via rollers (24) held rotationally movably in roller shoes (23), bear non-positively on a cam track (25) of a cam ring (26) coaxialy relative to the distributor shaft (19) and fixed in the pump casing (10), said coupling head (34) engages the distributor shaft (19) in a cup like manner and is formed at one end of the drive shaft (13) facing the distributor shaft (19), wherein the coupling head (34) has an axial portion (341) of reduced diameter on a free end face, wherein a thrust washer (40) bears on an annular shoulder (342) formed at a transition to the axial portion of reduced diameter, and wherein an inner bearing ring (42) of the ball bearing (41) bears on the axial portion (341) of reduced diameter of the coupling head (34) and axially on the thrust washer (40).

3. A fuel injection pump of the distributor type for supplying a plurality of injection nozzles ( 29 ) of internal-combustion engines, which comprises, a rotating drive shaft (13) mounted in a bearing bush (14) supported in a central bore (12) in a pump casing (10) near an exit of said drive shaft (13) from said pump housing, said drive shaft (13) is affected by a ball bearing (41) between a coupling head (34) and the pump casing (10) with said ball bearing supported radially and axially on the coupling head (34), a distributor shaft (19) is coupled fixedly in terms of rotation to the drive shaft (13) and which, during rotation, successively makes a connection between a pump working space (22) integrated in said pump and one of the injection nozzles (29), and with pump._pistons (21) which are each seated axially displaceably in a radial bore (20) of the distributor shaft (19) and which by means of one end face, each pump piston limits the pump working space (22) and by means of another end face of each of said pump pistons, via rollers (24) held rotationally movably in roller shoes (23), bear non-positively on a cam track (25) of a cam ring (26) coaxialy relative to the distributor shaft (19) and fixed in the pump casing (10), said coupling head (34) that engages the distributor shaft (19) in a cup like manner and is formed at one end of the drive shaft (13) facing the distributor shaft (19), wherein an inner bearing ring (42) of the ball bearing (41) is pressed against a thrust washer (40) onto an axial portion (341) of reduced diameter of the coupling head (34) and is retained by means of a retaining ring (45) inserted in an annular groove (46) in an axial portion (341).

4. A fuel injection pump of the distributor type for supplying a plurality of injection nozzles (29) of internal-combustion engines, which comprises, a rotating drive shaft (13) mounted in a bearing bush (14) supported .in a central bore (12) in a pump casing (10) near an exit of said drive shaft (13) from said pump housing, said drive shaft (13) is affected by a ball bearing (41) between a coupling head (34) and the pump casing (10) with said ball bearing supported radially and axially on the coupling head (34), a distributor shaft (19) is coupled fixedly in terms of rotation to the drive shaft (13) and which, during rotation, successively makes a connection between a pump working space (22) integrated in said pump and one of the injection nozzles (29), and with pump pistons (21) which are each seated axially displaceably in a radial bore (20) of the distributor shaft (19) and which by means of one end face, each pump piston limits the pump working space (22) and by means of another end face of each of said pump pistons, via rollers (24) held rotationally movably in roller shoes (23), bear non-positively on a cam track (25) of a cam ring (26) coaxialy relative to the distributor shaft (19) and fixed in the pump casing (10), said coupling head (34) that engages the distributor shaft (19) in a cup like manner and is formed at one end of the drive shaft (13) facing the distributor shaft (19) wherein an outer bearing ring (43) of the ball bearing (41) is supported in an axial direction on a casing shoulder (101) in the pump casing (10) and is clamped against the casing shoulder (101) by a distributor body (11) inserted into the pump casing (10) on an end face and receives the distributor shaft (19).

5. The injection pump as claimed in claim 1, wherein altogether four axial slots (35) arranged offset in each case at 90° to one another are arranged in the coupling head (34), wherein the coupling disk (37) has four radial coupling webs (371, 374) which are arranged offset at 90° to one another and of which two radial coupling webs (371, 373) arranged diametrically to one another are seated without play in the axial slots (35), and wherein the recess (38) in the coupling disk (37) has two flanks (381, 383) which extend parallel and at right angles to the radial coupling webs (371, 373) seated without play in the axial slots (35) and on which the end projection (39) of the distributor shaft (19) bears by means of parallel projecting surfaces (391, 392) pointing away from one another.

6. The injection pump as claimed in claim 1, wherein altogether three axial slots (35') are provided in the coupling head (34') of the distributor shaft (19) and correspondingly three coupling webs (371'-373') are provided on the coupling disk (37'), of which the coupling webs (371' 372' ) offset at the larger circumferential angle to one another are seated, as a result of a convex widening (50) of their web width., in the associated axial slots (35') without play in the circumferential direction and wherein the recess (38) in the coupling disk (37') has two flanks (381, 382) which extend at right angles to the coupling web (372') located furthest from the other two coupling webs (371', 373') and on which the end projection (39) of the distributor shaft (19) bears without play by means of parallel projecting surfaces (391, 392) pointing away from one another.

7. The injection pump as claimed in claim 1, wherein the coupling disk (37) rests on a slot bottom of the axial slots (35), and wherein the roller shoes (23) bear axially on the coupling disk (37).

8. The injection pump as claimed in claim 5, wherein the coupling disk (37) rests on a slot bottom of the axial slots (35), and wherein the roller shoes (23) bear axially on the coupling disk (37).

9. The injection pump as claimed in claim 6, wherein the coupling disk (37) rests on a slot bottom of the axial slots (35), and wherein the roller shoes (23) bear axially on the coupling disk (37).

10. The injection pump as claimed in claim 1, wherein the coupling disk (37) transmits a maximum torque, in such a way that the radially projecting coupling webs (371–374) break off when the torque maximum is exceeded.

11. The injection pump as claimed in claim 5, wherein the coupling disk (37) transmits a maximum torque, in such a way that the radially projecting coupling webs (371–374) break off when the torque maximum is exceeded.

12. The injection pump as claimed in claim 6, wherein the coupling disk (37) transmits a maximum torque, in such a way that the radially projecting coupling webs (371–374) break off when the torque maximum is exceeded.

13. The injection pump as claimed in claim 7, wherein the coupling disk (37) transmits a maximum torque, in such a way that the radially projecting coupling webs (371–374) break off when the torque maximum is exceeded.

14. The injection pump as claimed in claim 1, wherein the mounting of the drive shaft (13) in the pump casing (10) is effected by a plain bearing bush (14) near an exit of the drive shaft (13) from the pump casing (10) and by a ball bearing (41) between the coupling head (34) and pump casing (10) which is supported radially and axially on the coupling head (34).

15. The injection pump as claimed in claim 2, wherein the inner bearing ring (42) of the ball bearing (41) is pressed against the thrust washer (40) onto the axial portion (341) of reduced diameter of the coupling head (34) and is retained by means of a retaining ring (45) inserted in an annular groove (46) in the axial portion (341).

16. The injection pump as claimed in claim 2, wherein an outer bearing ring (43) of the ball bearing (41) is supported in the axial direction on a casing shoulder (101) in the pump casing (10) and is clamped against the casing shoulder (101) by a distributor body (11) inserted into the pump casing (10) on an end face and receives the distributor shaft (19).

17. The injection pump as claimed in claim 3, wherein an outer bearing ring (43) of the ball bearing (41) is supported in the axial direction on a casing shoulder (101) in the pump casing (10) and is clamped against the casing shoulder (101) by a distributor body (11) inserted into the pump casing (10) on an end face and receives the distributor shaft (19).

18. The injection pump as claimed in claim 4, wherein an outer bearing ring (43) of the ball bearing (41) is supported in the axial direction on a casing shoulder (101) in the pump casing (10) and is clamped against the casing shoulder (101) by a distributor body (11) inserted into the pump casing (10) on an end face and receives the distributor shaft (19).

* * * * *